United States Patent
Lin et al.

(10) Patent No.: US 11,855,465 B1
(45) Date of Patent: Dec. 26, 2023

(54) FULL CURRENT BALANCING METHOD OF STATE OF CHARGE FOR ENERGY STORAGE SYSTEM

(71) Applicant: Foshan Hechu Energy Technology Co., Ltd., Foshan (CN)

(72) Inventors: Weixing Lin, Foshan (CN); Wenping Zuo, Foshan (CN); Minglu Zhang, Foshan (CN)

(73) Assignee: Foshan Hechu Energy Technology Co., Ltd., Foshan (CN)

( * ) Notice: Subject to any disclaimer, the term of this patent is extended or adjusted under 35 U.S.C. 154(b) by 0 days.

(21) Appl. No.: 18/315,436

(22) Filed: May 10, 2023

Related U.S. Application Data (63) Continuation of application No. PCT/CN2023/087535, filed on Apr. 11, 2023.

(30) Foreign Application Priority Data

Oct. 25, 2022 (CN) .......................... 202211306250.9

(51) Int. Cl.
   *H02J 7/00* (2006.01)

(52) U.S. Cl.
   CPC ............ *H02J 7/0019* (2013.01); *H02J 7/005* (2020.01); *H02J 7/0024* (2013.01); *H02J 7/0048* (2020.01); *H02J 7/0031* (2013.01)

(58) Field of Classification Search
   USPC ........................................................ 320/134
   See application file for complete search history.

(56) References Cited

U.S. PATENT DOCUMENTS

| | | | | |
|---|---|---|---|---|
| 9,866,049 B2 * | 1/2018 | Kim | ..................... | H01M 10/443 |
| 2010/0085009 A1 * | 4/2010 | Kang | ..................... | H02J 7/0019 |
| | | | | 324/427 |

FOREIGN PATENT DOCUMENTS

| | | |
|---|---|---|
| CN | 108092352 A | 5/2018 |
| CN | 113612264 A | 11/2021 |
| JP | 2016-63578 A | 4/2016 |

OTHER PUBLICATIONS

CNIPA, Notification of a First Office Action for CN202211306250.9, dated Nov. 29, 2022.

(Continued)

*Primary Examiner* — Samuel Berhanu
(74) *Attorney, Agent, or Firm* — Zhigang Ma

(57) ABSTRACT

A full current balancing method of SOC for an energy storage system is provided. DC output terminals of each battery pack are connected in parallel with a half-bridge control circuit to form a battery module, positive and negative electrodes of battery modules are successively connected in series to form a battery cluster. In operation, SOCs of the battery modules are sorted, battery modules with lower SOCs are put in operation first when charging, and the battery modules with higher SOCs are put in operation first when discharging, thereby achieving full current balancing of SOC among the battery packs in the battery cluster. After multiple battery clusters are connected in parallel to form a battery stack, current of the battery cluster with a low SOC is increased, and current of the battery cluster with a high SOC is decreased, thereby achieving balancing of SOC among the battery clusters.

9 Claims, 3 Drawing Sheets

(56) References Cited

OTHER PUBLICATIONS

Foshan Hestorage Energy Technology Co., Ltd. (Applicant), Response to Notification of a First Office Action for CN202211306250.9, w/ (allowed) replacement claims, dated Dec. 2, 2022.

CNIPA, Notification to grant patent right for invention in CN202211306250.9, dated Dec. 12, 2022.

* cited by examiner

| periodically obtaining SOCs or terminal voltages of the battery packs in each the battery cluster, and sorting the SOCs or terminal voltages of the battery packs in each the battery cluster from small to large | S10 |

| determining states of charging and discharging of the battery cluster according to state information monitored by an energy monitoring system in the energy storage system; when the battery cluster is in the state of charging, controlling the full-controlled power electronic devices Q1 of $N_{on}$ number of the battery modules in the battery cluster corresponding to preceding $N_{on}$ number of the SOCs or terminal voltages after the sorting to be turned on to thereby make $N_{on}$ number of the battery packs of the $N_{on}$ number of the battery modules be put in operation, and controlling the full-controlled power electronic device Q2 in each remaining battery module in the battery cluster to be turned on to thereby make the battery pack of each the remaining battery module be cut off; when the battery cluster is in the state of discharging, controlling the full-controlled power electronic devices Q1 of $N_{on}$ number of the battery modules in the battery cluster corresponding to last $N_{on}$ number of the SOCs or terminal voltages after the sorting to be turned on to thereby make $N_{on}$ number of the battery packs of the $N_{on}$ number of the battery modules be put in operation, and controlling the full-controlled power electronic device Q2 in each remaining battery module in the battery cluster to be turned on to thereby make the battery pack of each the remaining battery module be cut off | S20 |

FULL CURRENT BALANCING METHOD OF STATE OF CHARGE FOR ENERGY STORAGE SYSTEM

FIELD OF THE DISCLOSURE

The disclosure relates to the field of electric power energy storage technology, and particularly to a full current balancing method of state of charge (SOC) for an energy storage system.

BACKGROUND OF THE DISCLOSURE

With a proportion of wind power generation and photovoltaic power generation in the electric power system will increase on a large scale, in order to resist intermittency and volatility problems caused by the large-scale new energy power generations, electric power storage will become an indispensable part of the future electric power system.

A existing battery energy storage system usually includes a battery system, a power conversion system (PCS) and an energy management system (EMS). The battery system includes a battery stack and a battery management system (BMS). In the battery stack, 20 to 50 number of battery cells connected in series or series-parallel to form a battery pack, dozens of the battery packs connected in series to form a battery cluster, and then several the battery clusters connected in parallel to form the battery stack. The battery management system (BMS) is used to manage each the battery cell in the battery stack, making SOCs of the respective battery cells are basically consistent and thereby maintaining a balancing state.

Existing balancing methods of SOC are mainly divided into two kinds of passive balancing and active balancing. The passive balancing uses the form of passive resistance consumption to discharge battery cells with excessive high voltages at a battery charging extremity, a balancing current is about 0.1 Amperes (A), and the battery cells can be equalized are generally 20 to 50 number of battery cells. However, if the number of battery cells connected in series within the battery cluster is increased to be more, the passive balancing will not be able to equalize SOCs of the respective battery cells. The active balancing uses a principle of active control. Through an active control mechanism, energy of the battery cell with high SOC is transferred to the battery cell with low SOC, so as to achieve the balancing of SOCs, and a balancing current is generally 0.5 A to 5 A. However, the active balancing has high cost and is not suitable for the balancing of SOCs of a long battery cluster composed of multiple battery cells connected in series.

A rated capacity of the battery cell in the existing energy storage system typically is 280 Ampere hours (Ah), and a working current of the battery cell is up to 140 A to 560 A. However, the existing passive balancing current is only 0.1 A, which is 0.02% to 0.07% of the working current of the battery cell; while the existing active balancing current is 0.5 A, which is 0.4% to 3.6% of the working current of the battery cell. Therefore, it can be seen that, either the active balancing or the passive balancing, its balancing ability is far lower than the working current of the battery cell. Due to the balancing ability of battery capacity is insufficient, a series of problems such as series-connection capacity loss of battery capacity, parallel-connection capacity loss, and parallel-connection circulation current will be caused, thus increasing battery capacity loss and operation energy consumption loss in a whole life cycle of the energy storage system, and degrading security of the energy storage system.

SUMMARY OF THE DISCLOSURE

Aiming at defects in the art, a purpose of the disclosure is to provide a full current balancing method of state of charge (SOC) for an energy storage system, which can effectively improve the balancing ability of SOC of the energy storage system, greatly improve security of the energy storage system, and avoid problems of series-connection capacity loss, parallel-connection capacity loss and parallel-connection circulation current of the energy storage system.

To achieve above purpose, an embodiment of the disclosure provides a full current balancing method of SOC for an energy storage system. A battery cluster in the energy storage system includes multiple (i.e., more than one) battery modules whose positive electrodes and negative electrodes are sequentially connected in series, each the battery module includes a battery pack and a half-bridge control circuit. The half-bridge control circuit includes two full-controlled power electronic devices Q1, Q2 connected in series, a high-voltage terminal of the full-controlled power electronic device Q1 is connected with a positive electrode of the battery pack, a low-voltage terminal of the full-controlled power electronic device Q1 and a high-voltage terminal of the full-controlled power electronic device Q2 are connected to form the positive electrode of the battery module, a low-voltage terminal of the full-controlled power electronic device Q2 is connected with a negative electrode of the battery pack to form the negative electrode of the battery module. The full current balancing method includes steps as follows:

(1) periodically obtaining SOCs or terminal voltages of all the battery packs in each the battery cluster, and sorting the SOCs or terminal voltages of the battery packs in each the battery cluster from small to large; and (2) determining states of charging and discharging of the battery cluster according to state information monitored by an energy management system in the energy storage system; when the battery cluster is in the state of charging, controlling the full-controlled power electronic devices Q1 of $N_{on}$ number of the battery modules in the battery cluster corresponding to preceding $N_{on}$ number of the SOCs or terminal voltages after the sorting to be turned on to thereby make $N_{on}$ number of the battery packs of the $N_{on}$ number of the battery modules be put in operation, and controlling the full-controlled power electronic device Q2 in each remaining battery module in the battery cluster to be turned on to thereby make the battery pack of each the remaining battery module be cut off; when the battery cluster is in the state of discharging, controlling the full-controlled power electronic devices Q1 of $N_{on}$ number of the battery modules in the battery cluster corresponding to last $N_{on}$ number of the SOCs or terminal voltages after the sorting to be turned on to thereby make $N_{on}$ number of the battery packs of the $N_{on}$ number of the battery modules be put in operation, and controlling the full-controlled power electronic device Q2 in each remaining battery module in the battery cluster to be turned on to thereby make the battery pack of each the remaining battery module be cut off.

Moreover, a formula for calculating $N_{on}$ is that: $N_{on}=\text{FLOOR}(n)$, $n=V_{ord}/V_{packavg}$, where the FLOOR represents a round down function, the $V_{ord}$ represents an output voltage order value of the battery cluster, the output voltage order value of the battery cluster is obtained by subtracting a current order value $I_{ord}$ of the battery cluster from a measured discharge current value $I_{dis}$ of the battery cluster and then performing proportional-integral adjustment on a difference value thereof, and the $V_{packavg}$ represents an average voltage of all battery packs in the battery cluster which are operated in non-fault states.

The full current balancing method of SOC for the energy storage system provided by the disclosure may have beneficials as follows: (1) direct current (DC) terminals of each the battery pack in the energy storage system have the half-bridge control circuit connected in parallel therebetween, and the battery pack is put in operation or cut off through the switch control of the half-bridge control circuit, so as to adjust charging or discharging time of the battery pack, and adjust the SOCs of the respective battery packs with current of the battery cluster, which can greatly improve balancing current between battery packs in the energy storage system, and thus the problems of series-connection capacity loss, parallel-connection capacity loss, and parallel-connection circulation current loss caused by multiple battery cells connected in series and/or in parallel in the energy storage system can be greatly avoided, and the cost of the whole life cycle of the energy storage system can be reduced; (2) the full current balancing method can realize direct series-connection of multiple battery packs in the battery cluster, and thus can avoid the problem that effective balancing cannot be achieved when the number of the battery cells connected in series exceeds a certain limit in the traditional passive balancing method or the traditional active balancing method, and thus it is convenient to construct a battery cluster with a higher voltage level, and a voltage of a single battery cluster can be increased to 3 kilovolts (kV)~10 kV from conventional typical 750 V~1500 V, thus facilitating to increase the capacity of single battery cluster; and (3) the full current balancing method can realize direct parallel-connection of multiple battery clusters on the DC side without the problems of parallel-connection circulation current and the parallel-connection capacity loss, and thus, through the parallel-connection of battery clusters on the DC side, it can realize convenient expansion of energy storage capacity on the DC side.

In an embodiment, when a battery stack of the energy storage system includes multiple the battery clusters connected in parallel, the full current balancing method further includes steps as follows:
  according to SOCs of the respective battery packs in each of the multiple battery clusters, calculating a SOC average value ($SOC_{avg}^{stack}$) of all of the battery packs in the battery stack and a SOC average value of all of the battery packs in each of the multiple battery clusters; and
  when the SOC average value ($SOC_{avg}^{k}$) of a kth battery cluster is inconsistent with the $SOC_{avg}^{stack}$, subtracting the $SOC_{avg}^{stack}$ from the $SOC_{avg}^{k}$ and then performing a proportional adjustment on a difference value thereof to obtain a current order deviation $\Delta I_{ord}$ of the kth battery cluster, and then correcting the current order value of the battery cluster through the current order deviation $\Delta I_{ord}$ of the kth battery cluster, thereby achieving balancing of SOC for the plurality of battery clusters in the battery stack.

In an embodiment, the full current balancing method further includes steps as follows:
  controlling a duty cycle of the half-bridge control circuit working of the battery module corresponding to a middle SOC or terminal voltage after the sorting as $D = n - N_{on}$ while controlling the $N_{on}$ number of the battery packs in the battery cluster to be put in operation, thereby making the measured discharge current value $I_{dis}$ of the battery cluster be controlled to be consistent with the current order value of the battery cluster after the correcting.

In an embodiment, each of the multiple battery clusters in the energy storage system further includes $N_{res}$ number of redundant battery modules, positive electrodes of the multiple battery clusters are connected together through respective bypass switches to form a positive bus of the battery stack, and negative electrodes of the multiple battery clusters are connected together to form a negative bus of the battery stack, and the full current balancing method further includes steps as follows:
  (a) determining whether the battery packs in each of the multiple battery cluster are faulty according to parameter information detected by a battery management system in the energy storage system; and
  (b) when a number of faulty battery pack in the battery cluster is smaller than or equal to the $N_{res}$, controlling the full-controlled power electronic device Q2 in the battery module with a faulty battery pack to be turned on, thereby making the faulty battery pack be cut off from a main path of the battery cluster; when the number of faulty battery pack in the battery cluster is greater than the $N_{res}$, controlling the full-controlled power electronic devices Q1, Q2 in the battery cluster to be turned off and controlling the bypass switch in the main path of the battery cluster to be switched off, thereby making the battery cluster be cut off from the battery stack.

In an embodiment, a number of the redundant battery modules is 5% to 8% of a rated number of the battery modules of the battery cluster.

In an embodiment, the positive electrodes of the multiple battery clusters are connected together each through a DC inductor and the bypass switch connected in series, to form the positive bus of the battery stack.

In an embodiment, the half-bridge control circuit further includes a passive balancing circuit, and the passive balancing circuit is configured (i.e., structured and arranged) to implement current balancing of battery cells in the battery pack.

In an embodiment, the half-bridge control circuit further includes an active balancing circuit, and the active balancing circuit is configured to implement current balancing of battery cells in the battery pack.

In an embodiment, each of the full-controlled power electronic devices Q1, Q2 includes one or more transistor and an anti-parallel diode connected thereto.

In an embodiment, the transistor is a metal oxide semiconductor field effect transistor (MOSFET).

DETAILED DESCRIPTION OF EMBODIMENTS

In order to make purposes, technical solutions and advantages of the disclosure clearer, the disclosure will be further described in detail in combination with the attached drawings and embodiments. It should be understood that the described embodiments are intended only to explain the disclosure and are not intended to limit it.

Figure 1:
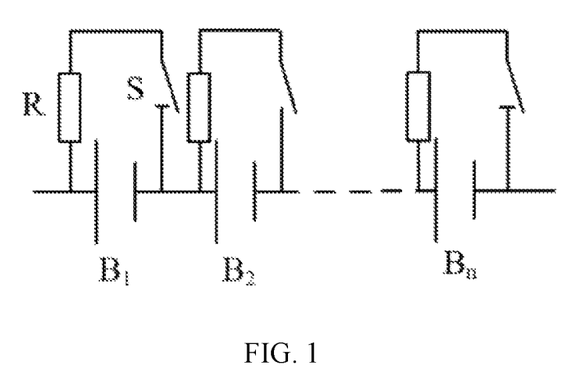
FIG. 1 illustrates a schematic topology diagram of an existing passive balancing circuit.

FIG. 1 illustrates a schematic topology diagram of an existing passive balancing circuit. As shown in FIG. 1, a discharge branch is connected in parallel at both ends of each of battery cells $B_1 \sim B_n$, and the discharge branch includes a resistor R and a switch S connected in series. When voltage or quantity of charge of a certain battery cell is too high, the discharge branch connected in parallel at direct current (DC) terminals of the battery cell will be switched on, discharging the electric energy of the battery cell, so that the electric energy of the battery cell is equalized to be consistent with that of other battery cells. In order to reduce the loss of the discharge branch, a current of the discharge branch is usually only about 100 mA, so that the balancing ability of the passive balancing method is very limited. At present, in the field of lithium battery energy storage, a typical rated capacity of a battery cell is 280 Ah and a typical rated working current of the battery cell is 140 A. Since a balancing current of the passive balancing method is only 100 mA, which is far less than a rated operation current of the battery cell, so that the balancing capability of the passive balancing method is very limited. When an energy storage system includes a battery stack formed by several battery clusters connected in parallel and each the battery cluster is formed by hundreds of batteries connected in series, since the limited balancing ability of the passive balancing method, SOCs of different battery cells in the same battery cluster may have significant differences, resulting in the series-connection capacity loss. Due to differences of the SOCs constituting the respective battery clusters, there will be voltage differences among different battery clusters, which leads to circulation current generated among the battery clusters, and thus problems of parallel-connection capacity loss and parallel-connection circulation current exist in the battery stack. The parallel circulation problem reduces efficiency of the energy storage system. The series capacity loss and parallel capacity loss reduce available capacity of the energy storage system and accelerate capacity attenuation of the energy storage system.

Figure 2:
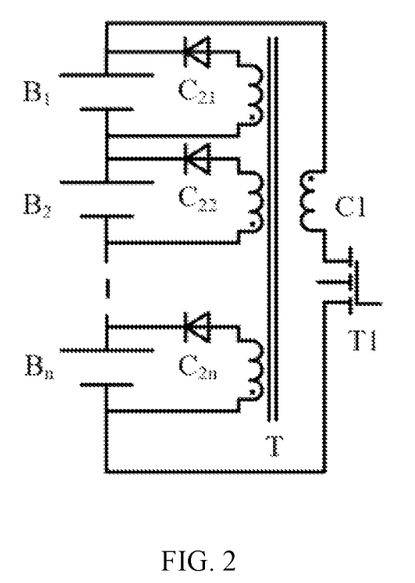
FIG. 2 illustrates a schematic topology diagram of an existing active balancing circuit.

FIG. 2 illustrates a schematic topology diagram of an existing active balancing circuit, as shown in FIG. 2. The active balancing circuit includes a switching transistor T1 and a transformer T with a primary coil C1 and secondary coils $C_{21} \sim C_{2n}$. When SOCs of battery cells are unbalanced, i.e., when a voltage difference between a maximum voltage and a minimum voltage of the battery cells $B_1 \sim B_n$ as detected exceeds an amplitude limit value (typically is 50 mV), the switching transistor T1 is turned on, the coil C1 is charged, and electric energy is stored in the coil C1. When the T1 is turned off, a reverse-phase voltage with equal amplitude is induced on each of the coil $C_{21} \sim C_{2n}$. For a battery cell with a relatively low voltage, the reverse-phase voltage is rectified through a diode and then charges the battery cell with the relatively low voltage. For the battery cell with a relatively high voltage, since a reverse cutoff characteristic of the diode, the reverse-phase voltage will not charge the battery cell with a relatively high voltage. As a result, the balancing of SOCs of different battery cells in a battery module can be realized. A balancing current of an active balancing method associated with FIG. 2 is in a range from 0.5 A to 5 A, which is 0.36% to 3.6% of the typical rated operating current of the battery cell, and thus the balancing ability is still low.

Figure 3:
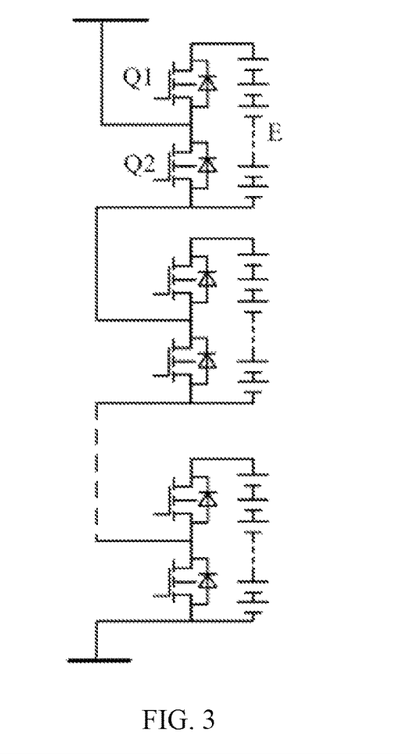
FIG. 3 illustrates a schematic topology diagram of full current balancing of a single battery cluster according to an embodiment of the disclosure.

In order to improve the balancing capability of SOC for an energy storage system, an embodiment of the disclosure provides a full current balancing method of SOC for an energy storage system. As shown in FIG. 3, a battery cluster in the energy storage system includes multiple battery modules whose positive electrodes and negative electrodes are sequentially connected in series. Each the battery module includes a battery pack E and a half-bridge control circuit. The half-bridge control circuit includes two full-controlled power electronic devices Q1 and Q2 which are connected in series and initially turned-off. A high-voltage terminal of the full-controlled power electronic device Q1 is connected to a positive electrode of the battery pack E, a low-voltage terminal of the full-controlled power electronic device Q1 and a high-voltage terminal of full-controlled power electronic device Q2 are connected to form the positive electrode of the battery module, and a low-voltage terminal of the full-controlled power electronic device Q2 and a negative electrode of the battery pack E are connected to form the negative electrode of the battery module. In an illustrated embodiment, each of the full-controlled power electronic devices Q1 and Q2 uses one or more transistors and an anti-parallel diode connected thereto, and the transistor is preferably a metal oxide semiconductor field effect transistor (MOSFET).

In the illustrated embodiment, in the energy storage system, the half-bridge control circuit formed by the full-controlled power electronic device Q1 and the full-controlled power electronic device Q2 connected in series is connected in parallel at DC terminals of the battery pack E. The purpose is to realize the battery pack being put in operation or cut off through a switching control of the half-bridge control circuit, so as to adjust a time duration of the battery pack to be charged or discharged. The battery pack is charged or discharged with current of the battery cluster, which can realize balancing of SOC between the battery packs in the battery cluster while greatly increasing the balancing current.

Figure 4:
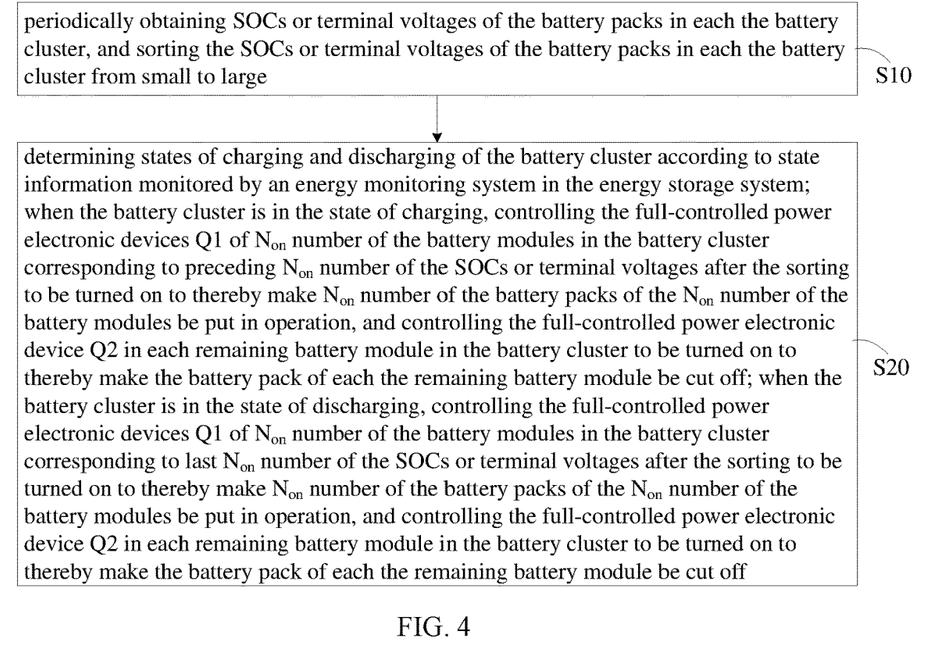
FIG. 4 illustrates a schematic flowchart of a full current balancing method of state of charge for an energy storage system according to an embodiment of the disclosure.

FIG. 4 illustrates a schematic flowchart of a full current balancing method of SOC for an energy storage system according to an embodiment of the disclosure. As shown in FIG. 4. the balancing method includes blocks S10 and S20, detailed as follows.

S10, periodically obtaining SOCs or terminal voltages of all battery packs in each battery cluster, and sorting the SOCs or terminal voltages of the respective battery packs in each the battery cluster from small to large.

At the block S10, the SOCs of the respective battery packs in each the battery cluster can be sorted as per a period (for example, 10 seconds) is sorted. The SOC and the terminal voltage of the battery pack can be obtained from parameter information monitored by an energy management system (EMS).

S20, determining states of charging and discharging of the battery cluster according to state information monitored by the EMS of the energy storage system. Specifically, in an embodiment, the states of charging and discharging of the battery cluster can be determined according to measured discharge current $I_{dis}$ of the battery cluster detected by the EMS; when the $I_{dis}$ is negative, the battery cluster is determined to be in the state of charging, whereas when the $I_{dis}$ is positive, the battery cluster is determined to be in the state of discharging.

When the battery cluster is in the state of charging, assuming that $N_{on}$ number of the battery packs need to be put in operation, controlling the full-controlled power electronic devices Q1 of $N_{on}$ number of the battery modules in the battery cluster corresponding to preceding $N_{on}$ number of the SOCs or terminal voltages after the sorting to be turned on to thereby make $N_{on}$ number of the battery packs of the $N_{on}$ number of the battery modules be put in operation, and controlling the full-controlled power electronic device Q2 in each remaining battery module in the battery cluster to be turned on to thereby make the battery pack of each the remaining battery module be cut off, that is, each the remaining battery module is neither charged nor discharged. When the battery cluster is in the state of discharging, assuming that $N_{on}$ number of the battery packs need to be put in operation, controlling the full-controlled power electronic devices Q1 of $N_{on}$ number of the battery modules in the battery cluster corresponding to last $N_{on}$ number of the SOCs or terminal voltages after the sorting to be turned on to thereby make $N_{on}$ number of the battery packs of the $N_{on}$ number of the battery modules be put in operation, and controlling the full-controlled power electronic device Q2 in each remaining battery module in the battery cluster to be turned on to thereby make the battery pack of each the remaining battery module be cut off, that is, each the remaining battery module is neither charged nor discharged.

Figure 5:
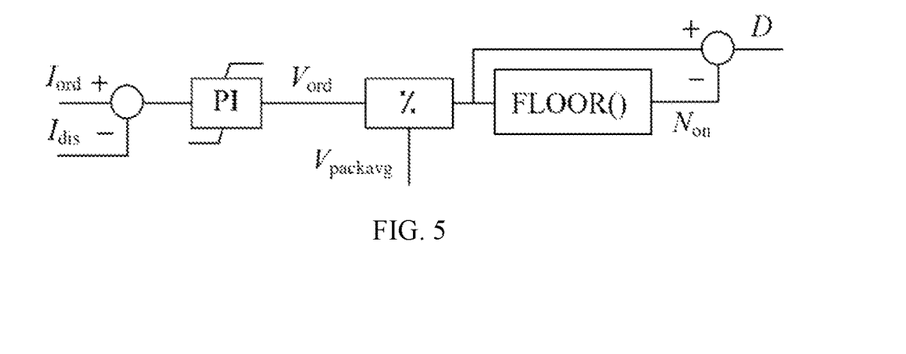
FIG. 5 illustrates a schematic block diagram of current closed-loop control of battery cluster according to an embodiment of the disclosure.

More specifically, as shown in FIG. 5, a formula for calculating the $N_{on}$ is that: $N_{on}$=FLOOR (n), n=$V_{ord}$/$V_{packavg}$; where the FLOOR represents a round down function, and the $V_{packavg}$ represents an average voltage of all battery packs operated in non-fault states in the battery cluster.

The $V_{ord}$ represents an output voltage order value of the battery cluster. A formula for calculating $V_{ord}$ is that: $V_{ord}$= (Kp+Ki/s) ($I_{ord}$−$I_{dis}$), where the $I_{ord}$ represents a current order value of the battery cluster, which can be obtained according to the EMS in the energy storage system; the $I_{dis}$ represents a measured discharge current value of the battery cluster, when the $I_{dis}$ is negative, it represents that the battery cluster is in the state of charging, whereas when the $I_{dis}$ is positive, it represents that the battery cluster is in the state of discharging; the (Kp+Ki/s) represents a proportional integration (PI) controller, i.e., after subtracting the $I_{dis}$ from the $I_{ord}$, performing amplification and integral adjustment (on the difference value thereof) through the PI controller to obtain the $V_{ord}$. The proportional coefficient Kp and the integral coefficient Ki in the PI controller provided in the illustrated embodiment have an adjustment principle to make an excess adjustment amount of the $I_{dis}$ is less than 5% and response time of the $I_{dis}$ is less than 10 ms, which can be obtained through experimental calibration after obtaining initial values through simulation.

After the full current balancing method of SOC for the energy storage system is used, balancing current between battery packs is consistent with operating current of the battery packs, and the balancing current between battery packs can be up to rated operating current of the battery packs, which can effectively improve balancing ability of the energy storage system. A battery cell of 280 Ah working at rated current of 140 A is taken as an example, in the traditional passive balancing method, the balancing current between battery packs is 100 mA, and in the traditional active balancing method, the balancing current between battery packs is 0.5 A~5 A, but in the full current balancing method according to the disclosure, the SOC balancing current between battery packs can reach 140 A, which is 1400 times of that in the traditional passive balancing method, and 28~280 times of that in the active balancing method. Therefore, it can be seen that, the full current balancing method according to the disclosure can greatly improve the balancing current between battery packs, thereby greatly avoiding the problems of series-connection capacity loss, parallel-connection capacity loss, and parallel-connection circulation current loss caused by multiple battery cells connected in series and/or in parallel in the energy storage system, and reducing the cost of a whole life cycle of the energy storage system.

The full current balancing method of SOC for the energy storage system provided by the disclosure may have beneficials as follows: (1) DC terminals of each the battery pack in the energy storage system have the half-bridge control circuit connected in parallel therebetween, and the battery pack is put in operation or cut off through the switch control of the half-bridge control circuit, so as to adjust charging or discharging time of the battery pack, and adjust the SOCs of the respective battery packs with current of the battery cluster, which can greatly improve equalized current between battery packs in the energy storage system, and thus the problems of series-connection capacity loss, parallel-connection capacity loss, and parallel-connection circulation current loss caused by multiple battery cells connected in series and/or in parallel in the energy storage system can be greatly avoided, and the cost of the whole life cycle of the energy storage system can be reduced; (2) the full current balancing method can realize direct series-connection of multiple battery packs in the battery cluster, and thus can avoid the problem that effective balancing cannot be achieved when the number of the battery cells connected in series exceeds a certain limit in the traditional passive balancing method or the traditional active balancing method, and thus it is convenient to construct a battery cluster with a higher voltage level, and a voltage of a single battery cluster can be increased to 3 kilovolts (kV)~10 kV from conventional typical 750 V~1500 V, thus facilitating to increase the capacity of single battery cluster; and (3) the full current balancing method can realize direct parallel-connection of multiple battery clusters on the DC side without the problems of parallel-connection circulation current and the parallel-connection capacity loss, and thus, through the parallel-connection of battery clusters on the DC side, it can realize convenient expansion of energy storage capacity on the DC side.

Figure 6:
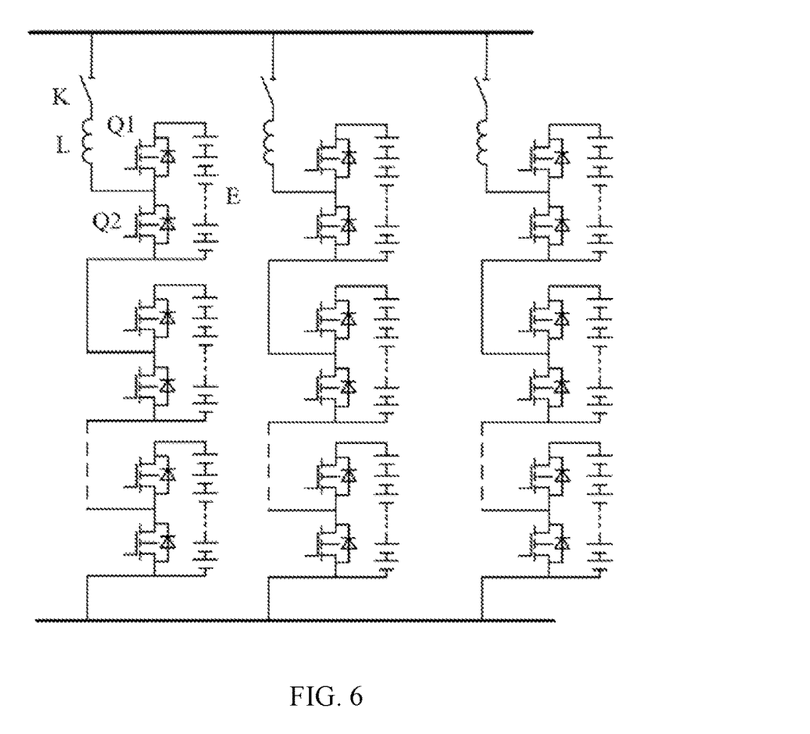
FIG. 6 illustrates a schematic topology diagram of full current balancing for multiple battery clusters connected in parallel according to an embodiment of the disclosure.

In one embodiment, as shown in FIG. 6, when a battery stack of the energy storage system is formed by multiple battery clusters connected in parallel, a full current balancing method for the battery packs in each of the multiple battery clusters in the battery stack is consistent with the above embodiment (as shown in FIG. 4), i.e., when the battery cluster is working in the state of charging, the $N_{on}$ number of battery packs with lower SOCs are put in operation, whereas when the battery cluster is in the state of discharging, the $N_{on}$ number of battery packs with higher SOCs are put in operation, thereby realizing the SOC balancing among the battery packs in any one of the multiple battery clusters.

In addition, the full current balancing method according to this illustrated embodiment can further realize the SOC balancing among the multiple battery clusters, and a realization principle is as follows. When the battery stack is in the state of charging, charging current of the battery cluster with a low SOC average value of the battery modules is increased, and a charging current of the battery cluster with a high SOC average value of the battery modules is decreased, thereby achieving the SOC balancing among the battery clusters in the battery stack during charging. When the battery stack is in the state of discharging, a discharging current of the battery cluster with a low SOC average value of the battery modules is decreased, and a discharging current of the battery cluster with a high SOC average value is increased, thereby achieving the SOC balancing among the battery clusters in the battery stack during discharging.

Figure 7:
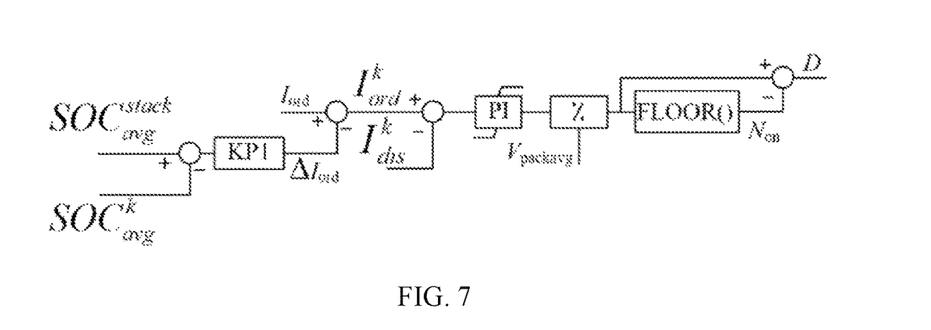
FIG. 7 illustrates a schematic block diagram of balancing control of SOC for multiple battery clusters according to an embodiment of the disclosure.

In an embodiment, as shown in FIG. 7, the SOC balancing among the multiple battery clusters can be implemented as per the following steps.

S30, according to SOCs of the respective battery packs in each of the multiple battery clusters, calculating an SOC average value $SOC_{avg}^{stack}$ of all the battery packs in the battery stack and a SOC average value of all the battery packs in each of the multiple battery clusters.

S40, when the SOC average value $SOC_{avg}^{k}$ of a kth battery cluster is inconsistent with the $SOC_{avg}^{stack}$, subtracting the $SOC_{avg}^{stack}$ from the $SOC_{avg}^{k}$, and then performing proportional adjustment (on a difference value thereof) through a proportional controller (KP1) to obtain a current order deviation $\Delta I_{ord}$ of the kth battery cluster, and then subtracting the current order deviation $\Delta I_{ord}$ of the battery cluster from the current order value $I_{ord}$ of the battery cluster, i.e., $I_{ord}-\Delta I_{ord}$, to correct the current order value of the battery cluster, thereby achieving balancing of SOC for the multiple battery clusters in the battery stack. In particular, when the $SOC_{avg}^{stack}$ is higher than the $SOC_{avg}^{k}$ which represents that the SOC average value of the kth battery cluster is lower than the SOC average value of the battery stack, the $\Delta I_{ord}$ calculated as per the illustration of FIG. 7 is positive, and thus reducing a current order $I_{ord}^{k}$ of the kth battery cluster. When the $SOC_{avg}^{stack}$ is lower than the $SOC_{avg}^{k}$, which represents that the SOC average value of the kth battery cluster is higher than the SOC average value of the battery stack, the $\Delta I_{ord}$ calculated as per the illustration of FIG. 7 is negative, and thus increasing the current order $I_{ord}^{k}$ of the kth battery cluster. As a result, the SOC balancing among the battery cluster in the battery stack can be realized.

Moreover, a proportional coefficient in the proportional controller in this illustrated embodiment takes the principle of making a time scale of system response be on the order of 10 second (s), which not only can realize the balancing, but also can avoid frequent adjustment of controller.

In some embodiments, in order to control a measured discharge current value of each the battery cluster to be consistent with a corrected current order value of the battery cluster, the corrected current order value of the battery cluster can be subtracted from the measured discharge current value of the battery cluster to obtain a difference value, and then the difference value is input to a PI controller to obtain an output voltage order value $V_{ord}$ of the battery cluster, subsequently the $V_{ord}$ is divided by an average voltage $V_{packavg}$ of the battery cluster to obtain the number of battery packs required to be put in operation in the battery cluster, i.e., $n=V_{ord}/V_{packavg}$. Afterwards, $N_{on}=FLOOR(n)$ number of battery packs in the battery cluster are put in operation, and a duty cycle of the half-bridge control circuit working of the battery module in the battery cluster corresponding to a middle one of SOCs or terminal voltages after sorting from small to large is controlled as $D=n-N_{on}$. For example, if the sorting numbers are 1~21, the half-bridge control circuit in the battery module corresponding to the sorting number of 11 is controlled to work in a PWM mode with the duty cycle of $D=n-N_{on}$, so that the measured discharge current value of the battery cluster is controlled to be consistent with the corrected current order value of the battery cluster.

In one embodiment, $N_{res}$ number of redundant battery modules can further be set in each of multiple battery clusters of the energy storage system, the number of the redundant battery modules can preferably be 5%~8% of the rated number of the battery modules of the battery cluster, positive electrodes of the multiple battery clusters are connected together through respective bypass switches K to form a positive bus of the battery stack, and negative electrodes of the multiple battery clusters are connected together to form a negative bus of the battery stack, as shown in FIG. 6. Furthermore, the positive electrodes of each of the multiple battery clusters can be connected together each through a DC inductor L and the bypass switch K connected in series, to form the positive bus of the battery stack. The DC inductor L is used to filter current of the battery cluster, and the bypass switch K is used to isolate a faulty battery cluster from the battery stack.

The full current balancing method according to some embodiments of the disclosure further includes steps as follows.

S50, determining whether the battery packs in each of the multiple battery cluster are faulty according to parameter information detected by a battery management system (BMS) in the energy storage system.

In the S50, the parameter information detected by the battery management system (BMS) may be temperature parameters and internal resistance parameters of the battery packs in each the battery cluster. When the temperature parameter and/or the internal resistance parameter of the battery pack exceed(s) a corresponding threshold(s), the battery pack is determined to be faulty.

S60, when a number of faulty battery pack in the battery cluster is smaller than or equal to the $N_{res}$, controlling the full-controlled power electronic device Q2 in the battery module with a faulty battery pack to be turned on, thereby making the faulty battery pack be cut off from a main path of the battery cluster; when the number of faulty battery pack in the battery cluster is greater than the $N_{res}$, controlling the full-controlled power electronic devices Q1, Q2 in the battery cluster to be turned off and controlling the bypass switch K in the main path of the battery cluster to be switched off, thereby making the battery cluster be cut off from the battery stack.

In the S60, when it is detected that a battery pack in a certain battery module is faulty caused by abnormal temperature, abnormal internal resistance and other fault, the faulty battery module is cut off from the main path of the battery cluster by switching on the full-controlled power electronic device Q2 of the battery module, and current of the battery cluster still passes through the full-controlled power electronic device Q2 in the faulty battery module, so that the battery cluster can continue operating. As long as the number of the faulty battery modules in the battery cluster is less than or equal to $N_{res}$, the battery cluster can maintain in continuous operation. When the number of battery modules in faulty states of the battery cluster is greater than $N_{res}$, the battery cluster is determined to be in a faulty state, and by switching off all the full-controlled power electronic devices of the faulty battery cluster, the current of the battery cluster is cut off, and then the bypass switch K of the battery cluster is turned off to make the faulty battery cluster be cut off from the battery stack.

In some embodiments, during maintenance, after replacing the faulty battery module with a new battery module, there is no need to manually adjust the SOC of the new battery module, and by using a full current balancing control principle same as that of the foregoing embodiments to control the half-bridge control circuit in the new battery module, balancing between the SOC of the new battery module and the SOCs of the battery modules in operation can be quickly realized, thereby realizing a plug-and-play fast operation and maintenance for the energy storage system.

In one embodiment, the full current balancing method according to some embodiments of the disclosure further can be used to realize balancing among battery cells in a battery pack. In terms of hardware, each of the battery cells in the battery pack is connected parallel with the discharge branch (as shown in FIG. 1) of the traditional passive balancing circuit; and in terms of control algorithm, the traditional passive balancing method (for details, please refer to the foregoing detailed description of the traditional passive balancing method) is used to achieve the balancing among the battery cells in the battery pack through passive balancing, and the full current balancing method according to the foregoing embodiments of the disclosure is used to achieve full current balancing among the battery packs as well as among the battery clusters. Of course, the traditional active balancing control can also be used, that is, in terms of hardware, the traditional active balancing circuit (as shown in FIG. 2) is employed in the battery pack, and in terms of control algorithm, the traditional active balancing method (for details, please refer to the foregoing detailed description of the traditional active balancing method) is used to realize the balancing among the battery cells in the battery pack through active balancing, and the full current balancing method according to the foregoing embodiments of the disclosure is used to realize full current balancing among the battery packs as well as among the battery clusters.

In an embodiment, the balancing circuit in each the battery pack can be integrated into the half-bridge control circuit of the battery module, so as to simplify the design of energy storage system and reduce the cost, size and wiring workload of energy storage system.

The full current balancing method according to some embodiments of the disclosure can divide SOC balancings of the energy storage system into three levels of balancing in battery pack, balancing among battery packs and balancing among battery clusters. In particular, the balancing in battery pack uses the traditional passive balancing or active balancing, and the balancing among battery packs and the balancing among battery clusters use the full current balancing according to the foregoing embodiments, which can realize hierarchical SOC balancings in the energy storage system, and the number of battery cells that need to be equalized by the traditional passive balancing or the traditional active balancing is reduced from 400~4000 to about 20, so that the cost of the BMS in the energy storage system can be reduced.

Those skilled in the art readily understand that the foregoing description is merely preferred embodiments of the disclosure and is not intended to limit the disclosure. Any modifications, equivalent substitutions and improvements made within the spirit and the principle of the disclosure should be included in the scope of protection of the disclosure.

What is claimed is:

1. A full current balancing method of state of charge (SOC) for an energy storage system, wherein a battery cluster in the energy storage system comprises a plurality of battery modules whose positive electrodes and negative electrodes are sequentially connected in series, each of the plurality of battery module comprises a battery pack and a half-bridge control circuit, the half-bridge control circuit comprises two full-controlled power electronic devices Q1, Q2 connected in series, a high-voltage terminal of the full-controlled power electronic device Q1 is connected to a positive electrode of the battery pack, a low-voltage terminal of the full-controlled power electronic device Q1 and a high-voltage terminal of the full-controlled power electronic device Q2 are connected to form the positive electrode of the battery module, and a low-voltage terminal of the full-controlled power electronic device Q2 is connected to a negative electrode of the battery pack to form the negative electrode of the battery module;

wherein the full current balancing method comprises the following steps:
(1) periodically obtaining SOCs or terminal voltages of the battery packs in each the battery cluster, and sorting the SOCs or terminal voltages of the battery packs in each the battery cluster from small to large; and
(2) determining states of charging and discharging of the battery cluster according to state information monitored by an energy management system in the energy storage system; when the battery cluster is in the state of charging, controlling the full-controlled power electronic devices Q1 of $N_{on}$ number of the battery modules in the battery cluster corresponding to preceding $N_{on}$ number of the SOCs or terminal voltages after the sorting to be turned on to thereby make $N_{on}$ number of the battery packs of the $N_{on}$ number of the battery modules be put in operation, and controlling the full-controlled power electronic device Q2 in each remaining battery module in the battery cluster to be turned on to thereby make the battery pack of each the remaining battery module be cut off; when the battery cluster is in the state of discharging, controlling the full-controlled power electronic devices Q1 of $N_{on}$ number of the battery modules in the battery cluster corresponding to last $N_{on}$ number of the SOCs or terminal voltages after the sorting to be turned on to thereby make $N_{on}$ number of the battery packs of the $N_{on}$ number of the battery modules be put in operation, and controlling the full-controlled power electronic device Q2 in each remaining battery module in the battery cluster to be turned on to thereby make the battery pack of each the remaining battery module be cut off;

wherein a formula for calculating the $N_{on}$ is that: $N_{on}=\text{FLOOR}(n)$, $n=V_{ord}/V_{packavg}$; where the FLOOR represents a round down function, the $V_{ord}$ represents an output voltage order value of the battery cluster, the output voltage order value of the battery cluster is obtained by subtracting a current order value $I_{ord}$ of the battery cluster from a measured discharge current value $I_{dis}$ of the battery cluster and performing proportional-integral adjustment on a difference value thereof, and the $V_{packavg}$ represents an average voltage of the battery packs in the battery cluster which are operated in non-fault states;

wherein when a battery stack of the energy storage system comprises a plurality of the battery clusters connected in parallel, the full current balancing method further comprises the following steps:

according to SOCs of the respective battery packs in each of the plurality of battery clusters, calculating a SOC average value ($SOC_{avg}^{stack}$) of all the battery packs in the battery stack and a SOC average value of all the battery packs in each of the plurality of battery clusters; and when the SOC average value ($SOC_{avg}^{k}$) of a kth battery cluster is inconsistent with the $SOC_{avg}^{stack}$, subtracting the $SOC_{avg}^{stack}$ from the $SOC_{avg}^{k}$ and then performing a proportional adjustment on a difference value thereof to obtain a current order deviation $\Delta I_{ord}$ of the kth battery cluster, and then correcting the current order value of the battery cluster through the current order deviation $\Delta I_{ord}$ of the kth battery cluster, thereby achieving balancing of SOC for the plurality of battery clusters in the battery stack.

2. The full current balancing method of SOC for the energy storage system according to claim 1, wherein the full current balancing method further comprises:

controlling a duty cycle of the half-bridge control circuit working of the battery module corresponding to a middle SOC or terminal voltage after the sorting as $D=n-N_{on}$ while controlling the $N_{on}$ number of the battery packs in the battery cluster to be put in operation, thereby making the measured discharge current value $I_{dis}$ of the battery cluster be controlled to be consistent with the current order value of the battery cluster after the correcting.

3. The full current balancing method of SOC for the energy storage system according to claim 1, wherein each of the plurality of battery clusters in the energy storage system further comprises $N_{res}$ number of redundant battery modules, positive electrodes of the plurality of battery clusters are connected together through respective bypass switches to form a positive bus of the battery stack, and negative electrodes of the plurality of battery clusters are connected together to form a negative bus of the battery stack, and the full current balancing method further comprises:

(a) determining whether the battery packs in each of the plurality of battery clusters are faulty according to parameter information detected by a battery management system in the energy storage system; and (b) when a number of faulty battery pack in the battery cluster is smaller than or equal to the $N_{res}$, controlling the full-controlled power electronic device Q2 in the battery module with a faulty battery pack to be turned on, thereby making the faulty battery pack be cut off from a main path of the battery cluster; when the number of faulty battery pack in the battery cluster is greater than the $N_{res}$, controlling the full-controlled power electronic devices Q1, Q2 in the battery cluster to be turned off and controlling the bypass switch in the main path of the battery cluster to be switched off, thereby making the battery cluster be cut off from the battery stack.

4. The full current balancing method of SOC for the energy storage system according to claim 3, wherein a number of the redundant battery modules is 5% to 8% of a rated number of the battery modules of the battery cluster.

5. The full current balancing method of SOC for the energy storage system according to claim 3, wherein the positive electrodes of the plurality of battery clusters are connected together each through a DC inductor and the bypass switch connected in series, to form the positive bus of the battery stack.

6. The full current balancing method of SOC for the energy storage system according to claim 1, wherein the half-bridge control circuit further comprises a passive balancing circuit, and the passive balancing circuit is configured to implement current balancing of battery cells in the battery pack.

7. The full current balancing method of SOC for the energy storage system according to claim 1, wherein the half-bridge control circuit further comprises an active balancing circuit, and the active balancing circuit is configured to implement current balancing of battery cells in the battery pack.

8. The full current balancing method of SOC for the energy storage system according to claim 1, wherein each of the full-controlled power electronic devices Q1, Q2 comprises one or more transistor and an anti-parallel diode connected thereto.

9. The full current balancing method of SOC for the energy storage system according to claim 8, wherein the transistor is a metal oxide semiconductor field effect transistor.

* * * * *